2,902,476
PROCESS FOR MAKING DIALLYLIDENE PENTAERYTHRITOL COPOLYMERS

Werner Kern and Gino Dall' Asta, Mainz (Rhine), Germany, assignors, by mesne assignments, to Hercules Powder Company, a corporation of Delaware No Drawing. Application October 19, 1953
Serial No. 387,042

Claims priority, application Germany December 17, 1952

2 Claims. (Cl. 260—78.5)

This invention relates to new resinous polymerization products prepared from condensation products of compounds having at least two neighboring free alkylol groups and unsaturated aldehydes and to methods for the preparation thereof. These new resinous products may be advantageously applied to many different technical uses.

In accordance with the process of the invention, condensation products of α,β-unsaturated aldehydes or ketones with compounds containing at least two neighboring free alkylol groups, are used as the monomer to be submitted to polymerization with the use of a suitable catalyst. Particularly suitable for the preparation of condensation products containing one or more terminal vinyl groups are polyhydric alcohols, e.g. pentaerythritol, which contain alkylol groups attached to a central carbon atom. However, other alcohols, such as glycerin or erythritol, can also be used for the purpose. The methylol compounds can be partially etherified or esterified. However, it is prerequisite for the preparation for a siutable monomer that at least two neighboring free methylol groups should be present. As monomeric initial material for the use in synthetic resins, there may be used, for example, such products as may be prepared according to German Patent 858,406 by reaction of α,β-unsaturated aldehydes with substances containing eventually esterified or etherified, but at least three free alkylol, particularly methylol groups, attached to a central carbon atom, in presence of acid-reacting substances at pH of about 3–5 and elevated temperatures, e.g., by treating trimethylolmethane or pentaerythritol with unsaturated aldehydes.

Acrolein has been found to be particularly fitted as the aldehyde constituent for the preparation of the monomer, since it leads to diallylidene compounds, which are particularly suitable for the polymerization in accordance with the invention. Compounds such as α,β-allylideneglycerin may also be used. However, particularly good results are obtained with diallylidene compounds, especially diallylidene pentaerythritol.

No polymerization products have hitherto been prepared from the above-described compounds. It has now been found that for the polymerization of these monomers, e.g., diallylidene pentaerythritol, if one has in mind a rapid commencement of the reaction and the formation of technically valuable products in satisfactory yield, azo and diazo compounds form particularly suitable reaction accelerators, which, under the usual polymerization conditions, form radicals on decomposition. Particularly good results are obtained on using azoisobutyronitrile and its homologs. Other derivatives of azoisobutyric acid and its homologs, e.g., the esters, can also be used in accordance with the process of the invention. As azo or diazo compounds having the properties mentioned above, there may also be named diazotized p-nitroaniline or 6-benzoyl-amino-4-methoxy-n-toluidine, and, for lower polymerization temperatures, also diazothioethers, such as 4-methylbenzene-diazo mercapto-2-naphthalene or the corresponding methoxy compound.

The use of other catalysts, e.g., peroxide compounds or substances having an ionic action, e.g., boron trifluoride-etherate, is included in the scope of the invention. However, in this case one must be prepared to find smaller yields and the formation of products having less desirable properties.

The polymermization for preparing the new synthetic resins in accordance with the invention can be carried out both in the melt and in solution. The properties of the product, e.g., as to solubility and fusibility, can be varied in many respects by regulating the temperature and the amount of catalyst. If azoisobutyronitrile is the catalyst, it should generally be used in an amount which does not exceed 10 mol. percent, referred to the quantity of monomer. Preferably, however, a maximum of 3 mol. percent catalyst is used.

The resultant polymerizates are, in general, colorless and can be freed in a simple manner from the monomers, either by dissolving, particularly in benzene, and subsequently precipitating with low-boiling gasoline fractions or by extraction. A particular advantage of the new products consists in the fact that, in general, they still contain a large proportion (up to about 50%) of free double bonds which are available for further reactions, especially for the preparation of mixed polymerizates. By adding to the polymerization mixture other polymerizable substances or their mixtures, especially monomeric vinyl acetate, diallyl phthalate or styrene, the properties of the resulting copolymerizate may be further varied to fit the particular application. Maleic acid, preferably in small amounts, may also be used to vary the properties of such products. It is further possible to add mixtures of natural resins and drying oils or their resinous modifications.

For the preparation of such mixed polymerizates and/or polymerizate mixtures it is, of course, also feasible to use peroxides or redox catalyst systems, e.g., benzoyl peroxide and tertiary amines, as well as the corresponding regulators and cocatalysts, or benzoyl peroxide-iron-acetylacetonate.

For the preparation of mixed polymerizates or polymerizate mixtures based on allylidene derivatives of polyalcohols, the polymerization can also be carried out in two stages. In connection with this there is a procedure by which it is very simple to direct the reaction, and which involves polymerization of an allylidene derivative with an azo compound. This is followed by the addition of one or more monomers, together with the same or other catalysts, and the polymerization is then carried to completion. In the preparation of the polymerizates in accordance with the process of the invention, the polymerization products were, as a rule, provided the catalyst contents were low, obtained in soluble form, and, as is more thoroughly described in the examples, isolated from the monomers by precipitation. By using higher catalyst concentrations and, if necessary, higher temperatures, it is also possible to obtain, if desired, practically insoluble polymerization products.

The synthetic resins obtained in accordance with the process of the invention can be processed in the known manner, and can advantageously be shaped under pressure, e.g., by the injection molding process. They are suitable in general for the preparation of shaped bodies, for lacquer resins, adhesives, insulation, and for the manufacture of artificial leathers.

The process of the invention is illustrated in the following:

*Example 1*

In order to prepare a synthetic resin in accordance with the process of the invention, 2.3 parts by weight (3 mol. percent) azoisobutyronitrile was dissolved in 100 parts by weight diallylidene pentaerythritol, after which the solution was heated under nitrogen in a sealed glass tube for three hours at 90° C. There was obtained a viscous melt, from which the polymerizate was precipitated with the use of benzine. Purification of the resulting polymer was effected by dissolving in benzene and precipitation with a 10-fold amount of low-boiling gasoline fraction. On drying there was obtained a completely colorless powdered product, which is soluble in a large number of known solvents, e.g., benzene, acetone, carbon tetrachloride, tetrahydrofuran and dimethylformamide. On the other hand it is insoluble in low boiling gasoline fractions, methanol, diethyl ether and water. The resin still contains free double bonds capable of polymerization and can be fused by careful heating to 150 to 170° C.

A similar product, which melts at Ca. 90° C. but resolidifies above this temperature, can also be obtained within a polymerization time of 4½ hours by increasing the polymerization temperature to 120° C.

Example 2

By adding only 0.77 part by weight (1 mol. percent) azoisobutyronitrile to 100 parts by weight diallylidene pentaerythritol, there is obtained after 3 hours of polymerization at 120° C. a viscous melt, which is processed as in Example 1, and which yields a colorless viscous polymerizate. The solubility properties correspond to those of the product described in the previous example, except that the melting temperature is lower, inasmuch as a colorless melt which can be drawn into a thread is obtained by heating the polymerizate to 40° to 50° C. This process is reversible and the resolidified polymerizate remains soluble in the solvents mentioned in Example 1.

Example 3

By using the same addition as described in Example 2, with, however, a polymerization temperature of 60° C. and a polymerization time of 23 hours, there is obtained an equally colorless pulverized polymerizate having the previously described solubility properties and still manifesting the presence of double bonds which are capable of polymerization. The polymerizate melts reversibly at 80° C. without any impairment of the solubility.

Example 4

For carrying out the polymerization in solution, 100 parts by weight diallylidene pentaerythritol together with 3.9 parts by weight (5 mol. percent) of azoisobutyronitrile were dissolved in 200 parts m-xylene, the operation being conducted at a temperature of 120° C. over a period of 3 hours. There resulted a viscous solution which, as in Example 1, could be processed into an absolutely colorless polymerizate. This product, too, exhibits the solubility properties mentioned in the foregoing example and can be converted at 90°–100° C. into a colorless melt which remains soluble in benzene after resolidification.

A similar product is obtained by a 23-hour polymerization at 60° C., the properties corresponding to those described in the foregoing example.

Example 5

By means of a 23 hour polymerization at 60° C. with the use of 5 mol. percent azoisobutyronitrile, there is obtained a viscous mass which is only partially soluble in benzene. The benzene-insoluble portion is also insoluble in other organic solvents and cannot be fused or softened by heating to 260° C.

Example 6

By adding an additional 5 mol. percent of azoisobutyronitrile to the melt resulting in Example 1 and continuing the polymerization at 60° C. for a period of 48 hours, there is obtained in approximately 100% conversion a practically insoluble polymerizate having properties similar to those described in the foregoing example.

Example 7

In the preparation of mixed polymerizates there is first used in accordance with the procedure of Example 1, 1 mol. percent of azoisobutyronitrile, resulting in a viscous melt, which is then reacted with an additional 2.3 parts by weight of azoisobutyronitrile and 100 parts by weight of styrene. In the second stage the polymerization takes place at 60° C. over a period of 14½ hours and results in a viscous opalescent mass. The copolymerizate is soluble in benzene and can be precipitated from this solution by means of low-boiling gasoline fractions into a powdered colorless polymerizate which is free of monomers.

In place of the azoisobutyronitrile, 4 parts by weight benzoyl peroxide can also be used in the second step of the polymerization, the product being the same.

Similar results are obtained when 5 parts by weight of maleic acid is added together with styrene to the product of the first stage, and if a mixture of benzoyl peroxide and trihexylamine is used as catalyst in the second stage.

The two-step polymerization can also be carried out in the second reaction stage, with the use of styrene as the second component together with benzoyl peroxide, in such a way as to prepare insoluble products. In order to achieve this, it is sufficient to prolong the polymerization time.

Example 8

By one-stop polymerization of 100 parts by weight diallylidene pentaerythritol, 100 parts by weight vinyl acetate and 2.3 parts by weight azoisobutyronitrile there is obtained within 7 hours at 60° C. a frothy gelatinous mass, containing in a high yield the copolymerizate of the two monomers. This polymerizate is insoluble in benzene and yields, on drying, a colorless powder.

Diallyl phthalate can also be used instead of vinyl acetate, the resulting copolymerizate, however, being viscous and yellow.

A very rapid mixed polymerization of diallylidene pentaerythritol and vinyl acetate can be effected by using 3 mol. percent catalyst at 90° C. After 25 minutes so many polymerization nuclei have been formed that the polymerization takes place almost instantly, with considerable heat evolution, forming an insoluble mixed polymerizate.

Example 9

If styrene is used instead of vinyl acetate in the mixture described in Example 8, there is obtained after a polymerization time of 12 hours a highly viscous melt which is readily soluble in benzene and which yields, on precipitation with low-boiling gasoline fractions, a colorless, powdery polymerizate, soluble in the usual organic solvents.

Example 10

By following the procedure described in Example 1, but with the use of 0.77 part azoisobutyronitrile, there is obtained after 3½ hours polymerization a viscous melt which remains soluble in benzene. On adding to this a solution of 3.5 parts benzoyl peroxide (3 mol percent referred to diallylidene pentaerythritol) in 100 parts styrene and polymerizing the mixture in a fused glass tube from which the oxygen, however, has not been removed, there is obtained after 24 hours polymerization at 60° C. a viscous resinous mass, only a small portion of which is soluble in benzene, while the principle portion consists of a benzene-insoluble mixed polymerizate.

Example 11

On proceeding as in Example 1, but with a polymerization temperature of 60° C. over a period of 30 hours, there is obtained a benzene-soluble viscous melt. On polymerizing this prepolymerizate with a solution 3.55 parts by weight benzoyl peroxide in 100 parts by weight of benzene, there is obtained after 100 hours at 60° C. an increase in the polymerization yield.

*Example 12*

Diallylidene pentaerythritol can also be polymerized with the aid of azoisovaleronitrile. By maintaining the same reaction conditions as described in Example 1, there is obtained in good yield, a reaction time of 1½ hours, a benzene-soluble polymerizate having the same properties as described in Example 1.

On prolonging the polymerization time for 2 hours, a large portion of the polymerizate becomes insoluble. Consequently, the polymerization rate with this catalyst is even higher than with azoisobutyronitrile.

What we claim and desire to protect by Letters Patent is:

1. The process for the preparation of resinous addition copolymers which comprises heating diallylidene pentaerythritol and a compound selected from the group consisting of vinyl acetate, diallyl phthalate, styrene and maleic acid in the presence of a free radical-producing catalyst to form an addition polymer.

2. The process for the preparation of resinous addition copolymers which comprises heating diallylidene pentaerythritol and a compound selected from the group consisting of vinyl acetate, diallyl phthalate, styrene and maleic acid in the presence of a catalyst selected from the group consisting of azo compounds and diazo compounds which yield free radicals by decomposition to form an addition copolymer.

References Cited in the file of this patent

UNITED STATES PATENTS

| | | |
|---|---|---|
| 2,401,776 | Rothrock | June 11, 1946 |
| 2,471,959 | Hunt | May 31, 1949 |
| 2,478,154 | Evans | Aug. 2, 1949 |

FOREIGN PATENTS

| | | |
|---|---|---|
| 707,280 | Germany | June 18, 1941 |
| 838,827 | Germany | May 12, 1952 |
| 858,406 | Germany | Dec. 8, 1952 |
| 868,351 | Germany | Feb. 23, 1953 |

OTHER REFERENCES

Schulz et al.: Angewandte Chemie, vol. 62, No. 5, pp. 105, 113, 114, 117, 118. (Copy in Sci. Libr.)

Schulz et al.: Angew. Chem. 62, pages 113 and 114 (1950). (Copy in Scientific Library.)